United States Patent
Kulkarni et al.

(10) Patent No.: US 8,420,238 B2
(45) Date of Patent: Apr. 16, 2013

(54) USE OF A TUNGSTEN BRONZE STRUCTURED MATERIAL AND TURBINE COMPONENT WITH A THERMAL BARRIER COATING

(75) Inventors: Anand A. Kulkarni, Oviedo, FL (US); Stefan Lampenscherf, Poing (DE); Ashkan Naeini, München (DE); Ramesh Subramanian, Oviedo, FL (US)

(73) Assignee: Siemens Aktiengesellschaft, München (DE)

( * ) Notice: Subject to any disclaimer, the term of this patent is extended or adjusted under 35 U.S.C. 154(b) by 869 days.

(21) Appl. No.: 12/227,567

(22) PCT Filed: Jan. 10, 2007

(86) PCT No.: PCT/EP2007/050218
§ 371 (c)(1),
(2), (4) Date: Sep. 29, 2009

(87) PCT Pub. No.: WO2007/137876
PCT Pub. Date: Dec. 6, 2007

(65) Prior Publication Data
US 2010/0047063 A1    Feb. 25, 2010

(30) Foreign Application Priority Data
May 30, 2006  (EP) .................................. 06011121

(51) Int. Cl.
*F01D 25/08* (2006.01)
*F01D 5/14* (2006.01)
*F04D 29/58* (2006.01)
*F04D 29/38* (2006.01)
*F03D 11/02* (2006.01)
*B64C 11/16* (2006.01)
*B32B 9/00* (2006.01)
*B32B 19/00* (2006.01)

(52) U.S. Cl.
USPC .... 428/701; 415/177; 416/241 B; 416/241 R; 428/697

(58) Field of Classification Search .................. 415/177; 416/241 B, 241 R; 428/697, 701
See application file for complete search history.

(56) References Cited

U.S. PATENT DOCUMENTS
5,993,980 A    11/1999  Schmitz et al.
6,680,126 B1 *  1/2004  Sambasivan et al. ......... 428/471
(Continued)

FOREIGN PATENT DOCUMENTS
EP    1 666 437 A2    6/2006
JP    10507230 T      7/1998
(Continued)

OTHER PUBLICATIONS

Kuang et al., "A powder X-Ray diffraction refinement of the BaNd2Ti3O10 structure", Materials Research Bulletin, vol. 37, 2002, pp. 1755-1761.*
Jacobson, "Synthesis and Reaction Chemistry of Layered Oxides with Perovskite-Related Structures", Chemical Physics of Intercalation II, 1993, pp. 117-139.*

*Primary Examiner* — Jonathan Langman

(57) ABSTRACT

A tungsten bronze structured ceramic material as a thermal barrier coating is described wherein the tungsten bronze structured ceramic coating material has the formula $AO\text{—}B_vO_w\text{—}C_yO_z$ where O stands for Oxygen, A stands for a 2+ or a 1+ cation, B stands for a 2+ or 3+ cation and C stands for a 4+ or a 5+ cation. The thermal barrier coating may be applied for gas turbine components.

8 Claims, 4 Drawing Sheets

U.S. PATENT DOCUMENTS

| | | |
|---|---|---|
| 2003/0003318 A1 | 1/2003 | Spitsberg et al. |
| 2003/0056520 A1 | 3/2003 | Campbell et al. |

FOREIGN PATENT DOCUMENTS

| | | |
|---|---|---|
| RU | 2053310 C1 | 1/1996 |
| RU | 2228389 C2 | 5/2004 |
| RU | 2260071 C1 | 9/2005 |
| RU | 2263157 C1 | 10/2005 |
| TW | 467875 B | 12/2001 |
| WO | WO 96/12049 | 4/1996 |
| WO | WO 99/55640 A2 | 11/1999 |

* cited by examiner

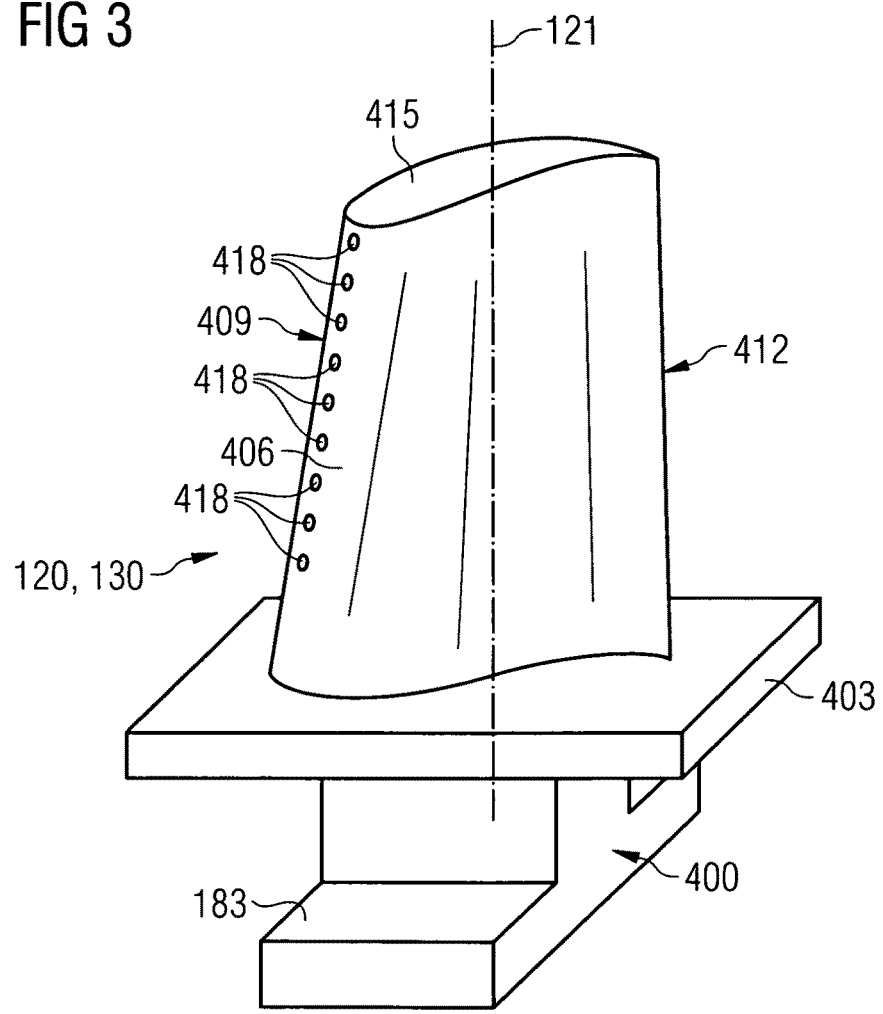

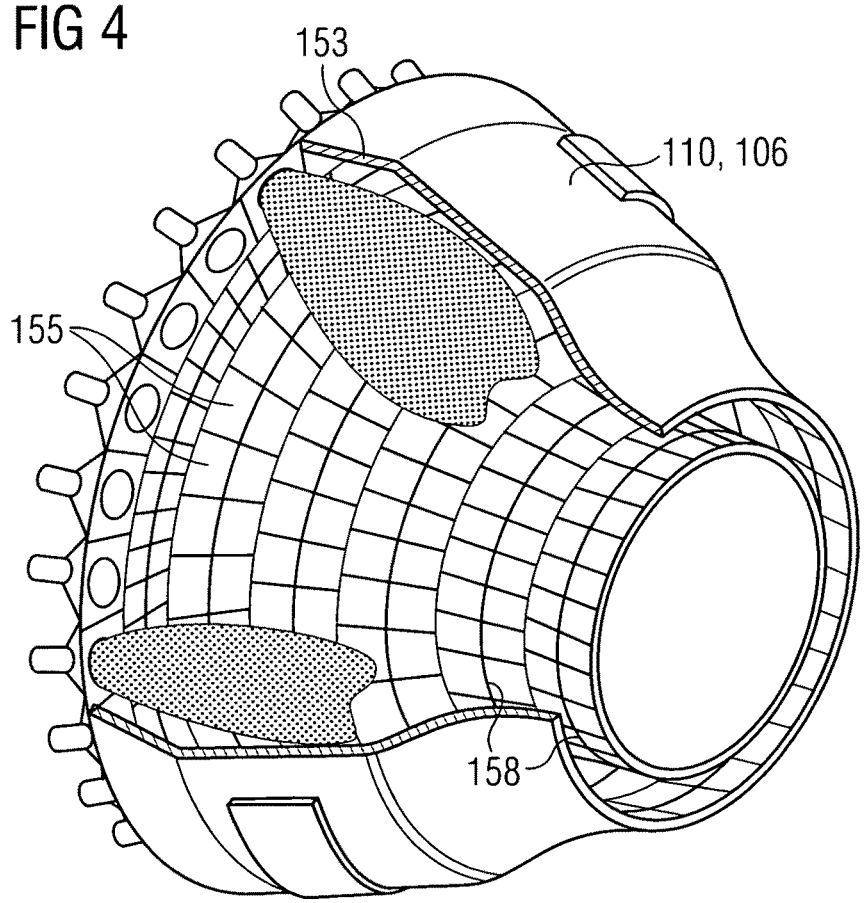

USE OF A TUNGSTEN BRONZE STRUCTURED MATERIAL AND TURBINE COMPONENT WITH A THERMAL BARRIER COATING

CROSS REFERENCE TO RELATED APPLICATIONS

This application is the US National Stage of International Application No. PCT/EP2007/050218, filed Jan. 10, 2007 and claims the benefit thereof. The International Application claims the benefits of European application No. 06011121.8 filed May 30, 2006, both of the applications are incorporated by reference herein in their entirety.

FIELD OF INVENTION

The present invention relates to the use of a tungsten bronze structured material and a turbine component with a thermal barrier coating.

BACKGROUND OF THE INVENTION

Thermal barrier coating (TBC) systems have been readily employed on first and second rows of turbine blades and vanes as well as on combustion chamber components exposed to the hot gas path of gas turbines. Typically, yttria stabilised zirconia barrier coatings are extensively applied to the hot sections and provide protection against thermal-mechanical shock, high-temperature oxidation and hot corrosion degradation.

While the primary drive to implement TBCs was initially the lifetime extension of the coated components, advanced gas turbines utilise TBCs more and more to allow increased efficiency and power output of a gas turbine. One measure to improve efficiency and power output is to reduce the cooling air consumption of the components in the hot gas path, i.e. by allowing those components to be operated at higher temperatures. The push to higher firing temperatures and reduced cooling flows generates an ongoing demand for advanced TBCs with higher temperatures, stability and better thermal isolation to achieve long term efficiency and performance goals of advanced gas turbines.

Present day TBCs often comprise a two-layer system: an outer isolating ceramic layer and an underlying oxidation resistant metallic layer (bond coat) deposited directly onto the surface of the metallic component. The bond coat provides the physical and chemical bond between the ceramic coating and the substrate and serves as an oxidation and corrosion resistant by forming a slow growing adherent protective alumina scale. The top ceramic layer provides benefits in performance, efficiency and durability through a) increased engine operating temperature b) extended metallic component lifetime when subjected to elevated temperature and stress and c) reduced cooling requirements for the metallic components. Depending on the ceramic layer thickness and through thickness heat flux, substrate temperatures can be reduced by several hundred degrees.

The development and acceptance of TBCs are closely linked to processing technology: in this connection, ceramic topcoats are presently deposited using air plasma spraying (APS) or electron beam physical vapour deposition (EB-PVD) processes. Although both coatings have the same chemical composition, their microstructures are fundamentally different from each other as are their thermal isolation properties and performances.

The desired increase in operating temperature is accomplished to a great extent by taking credit of the superior temperature capability of the ceramic TBC system in conjunction with its excellent thermal isolation behavior due to its low thermal conductivity. Improvement of the thermal isolation of the TBC can be achieved by increasing the TBC thickness, modification of the TBC microstructure (e.g. porosity) or by using materials with lower bulk thermal conductivity.

SUMMARY OF INVENTION

It is an objective of the present invention to provide a turbine component which allows for higher operating temperatures. It is a further objective of the present invention to explore a new class of potential TBC material composition.

The first objective is solved by a turbine component according to the claims. The second objective is solved by the use of a tungsten bronze structured material as claimed in the claims. The depending claims define further developments of the invention.

An inventive turbine component comprises a thermal barrier coating. The thermal barrier coating comprises a tungsten bronze structured ceramic coating material.

The current invention suggests improving the thermal isolation of the TBC by using tungsten bronze structured ceramic coating material with a lower bulk thermal conductivity. Typically these structures have excellent thermal, physical and mechanical properties. A combination of large complex unit cells with strongly anisotropic atomic bonding combined with high atomic mass makes them an ideal candidate for reduced thermal conductivity. Apart from the thermal-mechanical properties, the new TBCs also exhibit excellent phase stability over the operating temperature range and improved sintering resistance in extreme environments in the turbine section. In addition, they are compatible with conventional or new bond coat and super alloy materials.

The tungsten bronze structured ceramic coating material has the formula $AO-B_yO_w-C_yO_z$ where O stand for oxygen, A stands for a 2+ or 1+ cation, B stands for a 2+ or a 3+ cation and C stands for a 4+ or a 5+ cation. In the material described by this general formula the properties of the oxides depend on the nature of the A, B and C ions and also on the valence state of the ions. With the substitution of the A, B or C ions, it is possible to create and suppress oxygen vacancies in the structure, thus altering the bulk properties of the material.

In the general formula A may be selected from, or be a mixture of, the elements of the group consisting of Ba (barium), Mg (magnesium), Ca (calcium), Sr (strontium), Li (lithium), Na (sodium) and K (potassium). B may be selected from, or be a mixture of, the elements of the group consisting of the rare earth lanthanides, Co (cobalt), Mn (manganese), Sc (scandium), Y (yttrium), Al (aluminium), Ga (gallium) and In (indium). C may be selected from, or be a mixture of, the elements of the group consisting of Ti (titanium), Zr (zirconium), Hf (hafnium), Ce (cerium), Th (thorium), Nb (niobium) and Ta (tantalum).

A particularly suitable material for the tungsten bronze structured ceramic coating material is represented by the formula $BaO-RE_2O_3-xTiO_2$ where RE represents a rare earth lanthanide cation. The value of x may lie in the range between, and including, 2 and 5. In particular, the rare earth lanthanide cation may be neodymium (Nd) so that the tungsten bronze structured ceramic coating material can be described by the formula $BaNd_2Ti_4O_{12}$.

In the case of $BaO\text{-}RE_2O_3\text{-}xTiO_2$, one or more dopant could be added to Ba and/or RE and/or Ti for improving the bulk properties of the tungsten bronze structured ceramic by generating lattice defects. Suitable dopants for Ba are, e.g., Mg, Ca, Sr, Li, Na and K. Suitable dopants for RE are, e.g., other rare earth lanthanides, Co, Mn, Sc, Y, Al, Ga and In. Suitable dopants for Ti are, e.g., Zr, Hf, Ce, Th, Nb and Ta.

The inventive turbine component may further comprise an oxidation resistant metallic layer which is underlying the tungsten bronze structured ceramic coating material. A suitable oxidation resistant metallic layer is, e.g., an MCrAlX-layer where M is selected from the group consisting of Fe (iron), Co (cobalt), Ni (nickel) and Y stands for at least one element selected from the group consisting of Y (yttrium), Si (silicone), Hf (hafnium) and the rare earth elements.

According to another aspect of the invention a novel use of a tungsten bronze structured ceramic material is indicated. The material is used as a thermal barrier coating. The idea behind the invention is to utilise the advantageous intrinsic properties of low-loss microwave ceramics with tungsten bronze structures as very low-K materials and to improve the bulk properties of these ceramics.

Improving the bulk properties may be done by ionic substitution of multivalent cations, thus providing further reduction in thermal conductivity along with an increase of sintering resistance. The used tungsten bronze structure ceramic coating material may, therefore, have the formula $AO\text{---}B_vO_w\text{---}C_yO_z$ where O stands for oxygen, A stands for a 2+ or a 1+ cation, B stands for a 2+ or a 3+ cation and C stands for a 4+ or a 5+ cation. A may be selected from, or be a mixture of, the elements in the group consisting of Ba (barium), Mg (magnesium), Ca (calcium), Sr (strontium), Li (lithium), Na (sodium) and K (potassium). B may be selected from, or be a mixture of, the elements in the group consisting of the rare earth lanthanides, Co (cobalt), Mn (manganese), Sc (scandium), Y (yttrium), Al (aluminium), Ga (gallium) and In (indium). C may be selected from, or be a mixture of, the elements in the group consisting of Ti (titanium), Zr (zirconium), Hf (hafnium), Ce (cerium), Th (thorium), Nb (niobium) and Ta (tantalum).

Particularly advantageous tungsten bronze structured ceramic coating materials are represented by the formula $BaO\text{-}RE_2O_3\text{-}xTiO_2$ where RE represents a rare earth lanthanide cation. The value of x may lie in the range of 2 to 5 including the values 2 and 5. In particular, the used tungsten bronze structured ceramic coating material may be $BaNd_2Ti_4O_{12}$.

In the case of $BaO\text{-}RE_2O_3\text{-}xTiO_2$, one or more dopant could be added to Ba and/or RE and/or Ti for improving the bulk properties of the tungsten bronze structured ceramic by generating lattice defects. Suitable dopants for Ba are, e.g., Mg, Ca, Sr, Li, Na and K. Suitable dopants for RE are, e.g., other rare earth lanthanides, Co, Mn, Sc, Y, Al, Ga and In. Suitable dopants for Ti are, e.g., Zr, Hf, Ce, Th, Nb and Ta.

The improvement of thermal isolation along with higher temperature stability of TBCs will allow long term efficiency and performance goal of advanced gas turbines to be achieved providing a cost effective, efficient and environmentally sound power generation solution.

BRIEF DESCRIPTION OF THE DRAWINGS

Further features, properties and advantages will become clear from the following description of embodiments of the invention in conjunction with the accompanying drawings.
It shows.

DETAILED DESCRIPTION OF INVENTION

Figure 1:
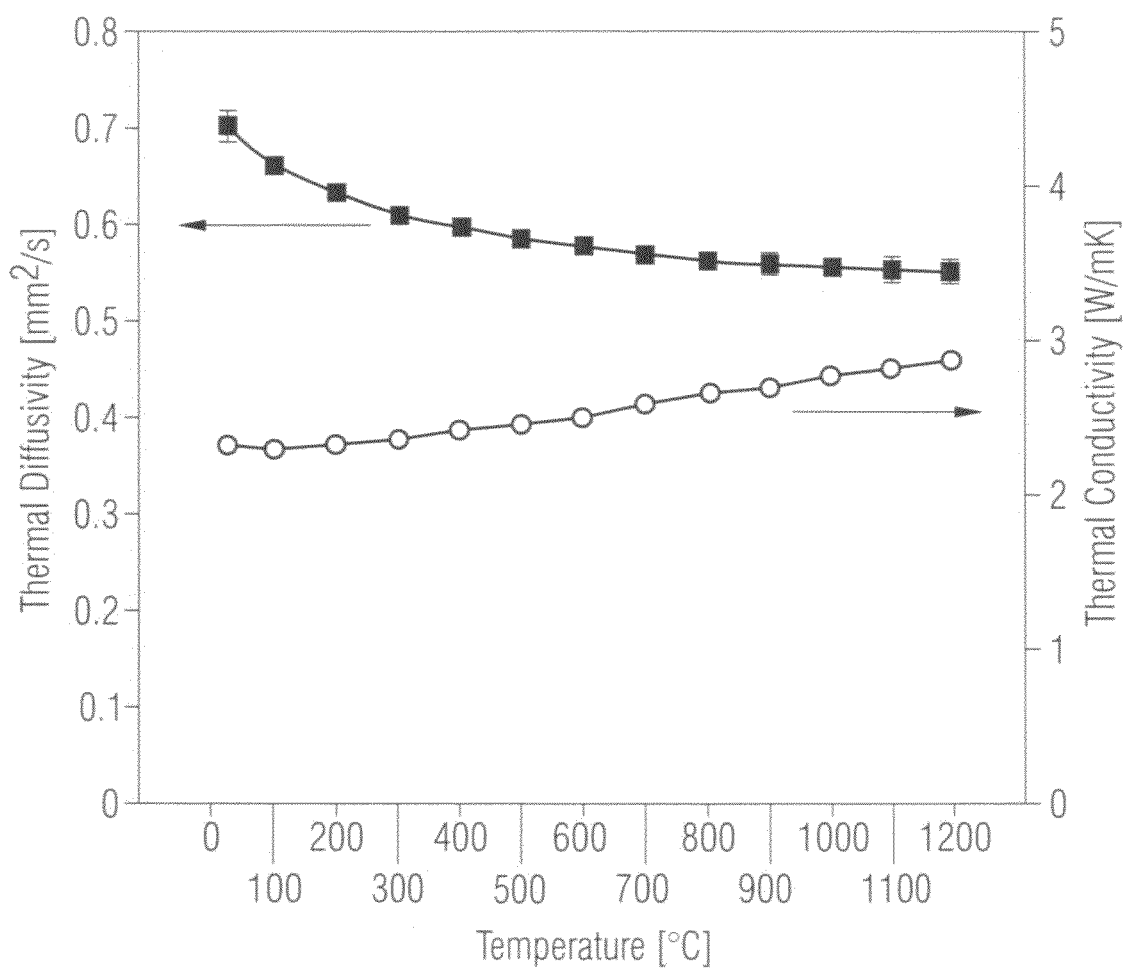
FIG. 1 the thermal conductivity and diffusivity of the composition $BaNd_2Ti_4O_{12}$ as a function of the temperature,
FIG. 2 a gas turbine,
FIG. 3 a turbine blade and
FIG. 4 a combustion chamber.

As has already been mentioned, the current invention suggests improving the thermal insulation of TBC by using tungsten bronze structure ceramic coating material with lower bulk thermal conductivity. Those materials have the general formula $AO\text{---}B_vO_w\text{---}C_yO_z$, with the properties of the oxides depending on the nature of the A, B and C ions and also on the valence state of the ions. With the substitution of A, B or C ions, it is possible to create and suppress oxygen vacancies in the structure, thus altering the bulk properties of the material.

A typical tungsten bronze structured ceramic coating material used in the present invention is $BaO\text{-}RE_2O_3\text{-}xTiO_2$ (x=2–5) where RE represents rare earth lanthanide cations, i.e. a cation from La (lanthanum) up to Lu (lutetium), typically La (lanthanum), Nd (neodymium), Gd (gadolinium), Sm (samarium), etc. In other words, with respect to the general formula, A is, in this example, substituted by Ba, B is substituted by RE, and C is substituted by Ti.

The properties of these ceramics strongly depend on their crystal structure, stochiometry and face composition. The crystal structure of, e.g., $BaO\text{-}RE_2O_3\text{-}xTiO_2$ changes with varying $TiO_2$ content. Compounds with x=4 and 5, e.g. $BaRETi_4$ and $BaRETi_5$, exhibit a structure with several tilted oxygen octahedrons (similar to a complex perovskite structure) and different kinds of vacancies partially occupied by heavy ions like barium and rare earths. In contrast, the crystal structure of compounds with a lower Ti-content, e.g. x=2 and 3, exhibits aligned layers of oxygen octahedrons with intermediate barium layers.

Partial or complete substitution of an A-site with a 2+ or 1+ cation will result in an increase phonon scattering due to more atomic disorder in the system (e.g. substitution of the large Ba ion with a smaller 2+ cation or 1+ cation). The 2+ cation may include Mg, Ca, Sr etc. and the 1+ cation may include Li, Na, K etc. Partial substitution can, e.g., be done by doping.

B-site typically represents rare earth lanthanide cations La up to Lu, typically La, Nd, Gd, Sm, Dy, Er etc. Partial or complete substitution of the B-site with a 2+ or a 3+ cation will result in increased phonon scattering due to more atomic disorder and increased vacancy concentration in the system. The 2+ cation can include Co, Mn etc. and the 3+ cation may include a fellow lanthanide cation or one from Sc, Y, Al, Ga and In. Partial substitution can, e.g., be done by doping.

C-site is typically $Ti^{4+}$ in this case. However, partial or complete substitution of the C-side with a 4+ or 5+ cation will result in increased phonon scattering due to more atomic disorder and increased vacancy concentration in the system. The 4+ cation can include Zr, Hf, Ce and Th, and the 5+ cation can include Nb or Ta. Partial substitution can, e.g., be done by doping.

With the formation of the higher vacancy concentration, the formation of vacancy pairs or clusters can result in "atomic level porosity". From the literature it is known that the formation of nano-pores can result in a significant conductivity decrease. Atomic level porosity can further contribute to this decrease. Another advantage is the reduction in the diffusion coefficients of clusters, thereby increasing the inherent sintering resistance of the material.

A number of combinations of the system can be obtained through one or more substitutions of elements in the general formula. The final selection of TBCs will be based upon the optimal combination of bulk properties and also the process capabilities for depositing the coatings.

The materials suggested for use as thermal barrier coatings in the present invention have been extensively used as high dielectric microwave ceramics with a very low thermal coefficient of permittivity (TCε) and high quality factor (Q-factor). The above-mentioned compounds are in accordance with the selection rule established by Clarke's semi-classical thermal conductivity model, as described C. Levi, Solid state and material science, 2004, for low-K TBC compounds. Typically these structures have excellent thermal, physical and mechanical properties.

As a specific example for the above-mentioned tungsten bronze structured ceramic coating materials, a sample of a composition $BaNd_2Ti_4O_{12}$ has been prepared and examined for its thermal conductivity and diffusivity as a function of temperature. The results of the measurements are depicted in FIG. 1. The temperatures depicted in the FIG. 1 range from 0° C. up to 1,200° C. The results are shown in FIG. 1. From the figure it can be seen that in the whole depicted temperature range the thermal conductivity measured in watt/m and Kelvin is below 3 W/(mK). In addition, the thermal conductivity only increases slightly with increasing temperature. Furthermore, the thermal diffusivity of this material (measured in $mm^2/s$) is not higher than about 0.7 $mm^2/s$ with the highest value at 0° C. Throughout the depicted temperature range, the thermal diffusivity then falls to about 0.55 $mm^2/s$ at 1,200° C.

The results show that the material is highly suitable for using it as a thermal barrier coating.

The described materials can, in particular, be employed as thermal barrier coatings on turbine components, such as turbine blades and vanes or combustion chamber components in the hot gas path of a gas turbine. In this case such a turbine component is coated with a tungsten bronze structured ceramic coating, as discussed above. A bond coat, e.g., an MCrAlX-layer may be provided on the turbine component before applying the tungsten bronze structured ceramic material as the thermal barrier coating. In MCrALX, M stands for Fe, Co or Ni. X is an active element selected from or being a mixture of the elements in the group consisting of Y, Si, Hf or a rare earth element. Such alloys are, e.g., known from EP 0 486 489 B1, EP 0 786 017 B1, EP 0 412 397 B1 or EP 1 306 454 A1, the disclosure of which with respect to the chemical composition of the alloys shall be part of the present specification.

Figure 2:
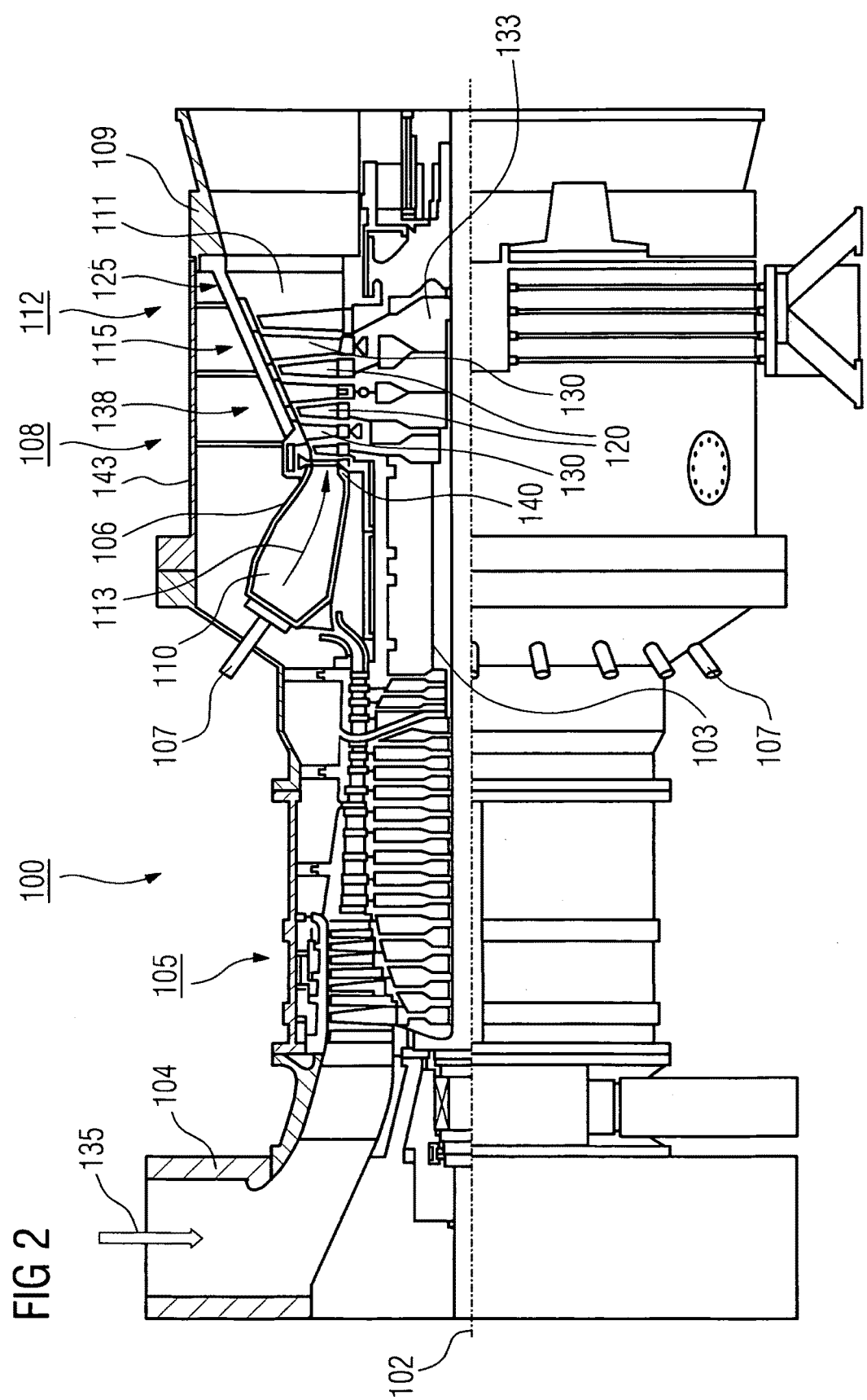

FIG. 2 shows, by way of example, a partial longitudinal section through a gas turbine 100.

In the interior, the gas turbine 100 has a rotor 103 which is mounted such that it can rotate about an axis of rotation 102, has a shaft 101 and is also referred to as the turbine rotor.

An intake housing 104, a compressor 105, a, for example, toroidal combustion chamber 110, in particular an annular combustion chamber, with a plurality of coaxially arranged burners 107, a turbine 108 and the exhaust-gas housing 109 follow one another along the rotor 103.

The annular combustion chamber 110 is in communication with a, for example, annular hot-gas passage 111, where, by way of example, four successive turbine stages 112 form the turbine 108.

Each turbine stage 112 is formed, for example, from two blade or vane rings. As seen in the direction of flow of a working medium 113, in the hot-gas passage 111 a row of guide vanes 115 is followed by a row 125 formed from rotor blades 120.

The guide vanes 130 are secured to an inner housing 138 of a stator 143, whereas the rotor blades 120 of a row 125 are fitted to the rotor 103 for example by means of a turbine disk 133.

A generator (not shown) is coupled to the rotor 103.

While the gas turbine 100 is operating, the compressor 105 sucks in air 135 through the intake housing 104 and compresses it. The compressed air provided at the turbine-side end of the compressor 105 is passed to the burners 107, where it is mixed with a fuel. The mix is then burnt in the combustion chamber 110, forming the working medium 113. From there, the working medium 113 flows along the hot-gas passage 111 past the guide vanes 130 and the rotor blades 120. The working medium 113 is expanded at the rotor blades 120, transferring its momentum, so that the rotor blades 120 drive the rotor 103 and the latter in turn drives the generator coupled to it.

While the gas turbine 100 is operating, the components which are exposed to the hot working medium 113 are subject to thermal stresses. The guide vanes 130 and rotor blades 120 of the first turbine stage 112, as seen in the direction of flow of the working medium 113, together with the heat shield bricks which line the annular combustion chamber 110, are subject to the highest thermal stresses.

To be able to withstand the temperatures which prevail there, they can be cooled by means of a coolant.

Substrates of the components may likewise have a directional structure, i.e. they are in single-crystal form (SX structure) or have only longitudinally oriented grains (DS structure).

By way of example, iron-based, nickel-based or cobalt-based superalloys are used as material for the components, in particular for the turbine blade or vane 120, 130 and components of the combustion chamber 110.

Superalloys of this type are known, for example, from EP 1 204 776 B1, EP 1 306 454, EP 1 319 729 A1, WO 99/67435 or WO 00/44949; these documents form part of the disclosure with regard to the chemical composition of the alloys.

The guide vane 130 has a guide vane root (not shown here) facing the inner housing 138 of the turbine 108 and a guide vane head at the opposite end from the guide vane root. The guide vane head faces the rotor 103 and is fixed to a securing ring 140 of the stator 143.

FIG. 3 shows a perspective view of a rotor blade 120 or guide vane 130 of a turbomachine, which extends along a longitudinal axis 121.

The turbomachine may be a gas turbine of an aircraft or of a power plant for generating electricity, a steam turbine or a compressor.

The blade or vane 120, 130 has, in succession along the longitudinal axis 121, a securing region 400, an adjoining blade or vane platform 403 and a main blade or vane part 406 as well as a blade or vane tip 415.

As a guide vane 130, the vane 130 may have a further platform (not shown) at its vane tip 415.

A blade or vane root 183, which is used to secure the rotor blades 120, 130 to a shaft or disk (not shown), is formed in the securing region 400.

The blade or vane root 183 is designed, for example, in hammerhead form. Other configurations, such as a fir-tree or dovetail root, are possible.

The blade or vane 120, 130 has a leading edge 409 and a trailing edge 412 for a medium which flows past the main blade or vane part 406.

In the case of conventional blades or vanes 120, 130, by way of example solid metallic materials, in particular superalloys, are used in all regions 400, 403, 406 of the blade or vane 120, 130.

Superalloys of this type are known, for example, from EP 1 204 776 B1, EP 1 306 454, EP 1 319 729 A1, WO 99/67435 or WO 00/44949; these documents form part of the disclosure with regard to the chemical composition of the alloy.

The blade or vane 120, 130 may in this case be produced by a casting process, also by means of directional solidification, by a forging process, by a milling process or combinations thereof.

Workpieces with a single-crystal structure or structures are used as components for machines which, in operation, are exposed to high mechanical, thermal and/or chemical stresses.

Single-crystal workpieces of this type are produced, for example, by directional solidification from the melt. This involves casting processes in which the liquid metallic alloy solidifies to form the single-crystal structure, i.e. the single-crystal workpiece, or solidifies directionally.

In this case, dendritic crystals are oriented along the direction of heat flow and form either a columnar crystalline grain structure (i.e. grains which run over the entire length of the workpiece and are referred to here, in accordance with the language customarily used, as directionally solidified) or a single-crystal structure, i.e. the entire workpiece consists of one single crystal. In these processes, a transition to globular (polycrystalline) solidification needs to be avoided, since non-directional growth inevitably forms transverse and longitudinal grain boundaries, which negate the favorable properties of the directionally solidified or single-crystal component.

Where the text refers in general terms to directionally solidified microstructures, this is to be understood as meaning both single crystals, which do not have any grain boundaries or at most have small-angle grain boundaries, and columnar crystal structures, which do have grain boundaries running in the longitudinal direction but do not have any transverse grain boundaries. This second form of crystalline structures is also described as directionally solidified microstructures (directionally solidified structures).

Processes of this type are known from U.S. Pat. No. 6,024,792 and EP 0 892 090 A1; these documents form part of the disclosure with regard to the solidification process.

The blades or vanes 120, 130 may likewise have coatings protecting against corrosion or oxidation, e.g. MCrAlX (M is at least one element selected from the group consisting of iron (Fe), cobalt (Co), nickel (Ni), X is an active element and represents yttrium (Y) and/or silicon and/or at least one rare earth element, or hafnium (Hf)). Alloys of this type are known from EP 0 486 489 B1, EP 0 786 017 B1, EP 0 412 397 B1 or EP 1 306 454 A1, which are intended to form part of the present disclosure with regard to the chemical composition of the alloy.

The density is preferably 95% of the theoretical density. A protective aluminum oxide layer (TGO=thermally grown oxide layer) forms on the MCrAlX layer (as an intermediate layer or an outermost layer).

It is also possible for a thermal barrier coating, consisting for example of $ZrO_2$, $Y_2O_3$—$ZrO_2$, i.e. unstabilized, partially stabilized or fully stabilized by yttrium oxide and/or calcium oxide and/or magnesium oxide, which is preferably the outermost layer, to be present on the MCrAlX.

The thermal barrier coating covers the entire MCrAlX layer. Columnar grains are produced in the thermal barrier coating by means of suitable coating processes, such as for example electron beam physical vapor deposition (EB-PVD).

Other coating processes are conceivable, for example atmospheric plasma spraying (APS), LPPS, VPS or CVD. The thermal barrier coating may include porous grains which have microcracks or macrocracks for improving its resistance to thermal shocks. The thermal barrier coating is therefore preferably more porous than the MCrAlX layer.

The blade or vane 120, 130 may be hollow or solid in form. If the blade or vane 120, 130 is to be cooled, it is hollow and may also have film-cooling holes 418 (indicated by dashed lines).

FIG. 4 shows a combustion chamber 110 of the gas turbine 100. The combustion chamber 110 is configured, for example, as what is known as an annular combustion chamber, in which a multiplicity of burners 107 arranged circumferentially around an axis of rotation 102 open out into a common combustion chamber space 154 and generate flames 156. For this purpose, the combustion chamber 110 overall is of annular configuration positioned around the axis of rotation 102.

To achieve a relatively high efficiency, the combustion chamber 110 is designed for a relatively high temperature of the working medium M of approximately 1000° C. to 1600° C. To allow a relatively long service life even with these operating parameters, which are unfavorable for the materials, the combustion chamber wall 153 is provided, on its side which faces the working medium M, with an inner lining formed from heat shield elements 155.

A cooling system may also be provided for the heat shield elements 155 and/or their holding elements, on account of the high temperatures in the interior of the combustion chamber 110. The heat shield elements 155 are then, for example, hollow and if appropriate also have cooling holes (not shown) opening out into the combustion chamber space 154.

Each heat shield element 155 made from an alloy is provided on the working medium side with a particularly heat-resistant protective layer (MCrAlX layer and/or ceramic coating) or is made from high-temperature-resistant material (solid ceramic bricks).

These protective layers may be similar to those used for the turbine blades or vanes, i.e. for example meaning MCrAlX: M is at least one element selected from the group consisting of iron (Fe), cobalt (Co), nickel (Ni), X is an active element and represents yttrium (Y) and/or silicon and/or at least one rare earth element, or hafnium (Hf). Alloys of this type are known from EP 0 486 489 B1, EP 0 786 017 B1, EP 0 412 397 B1 or EP 1 306 454 A1, which are intended to form part of the present disclosure with regard to the chemical composition of the alloy.

It is also possible for a, for example, ceramic thermal barrier coating, consisting for example of $ZrO_2$, $Y_2O_3$—$ZrO_2$, i.e. unstabilized, partially stabilized or fully stabilized by yttrium oxide and/or calcium oxide and/or magnesium oxide, to be present on the MCrAlX.

Columnar grains are produced in the thermal barrier coating by means of suitable coating processes, such as for example electron beam physical vapor deposition (EB-PVD).

Other coating processes are conceivable, for example atmospheric plasma spraying (APS), LPPS, VPS or CVD. The thermal barrier coating may have porous grains which have microcracks or macrocracks to improve its resistance to thermal shocks.

Refurbishment means that after they have been used, protective layers may have to be removed from turbine blades or vanes 120, 130, heat shield elements 155 (e.g. by sand-blasting). Then, the corrosion and/or oxidation layers and products are removed. If appropriate, cracks in the turbine blade or vane 120, 130 or the heat shield element 155 are also repaired. This is followed by recoating of the turbine blades or vanes 120, 130, heat shield elements 155, after which the turbine blades or vanes 120, 130 or the heat shield elements 155 can be reused.

The invention claimed is:

1. A turbine component, comprising:
    a substrate; and
    a thermal barrier coating arranged on the substrate, wherein the thermal barrier coating comprises a tungsten bronze structured ceramic coating material,
    wherein the tungsten bronze structured ceramic coating material has the formula $AO-B_vO_w-C_yO_z$ where O stands for Oxygen, A stands for a 2+ or a 1+ cation, B stands for a 2+ or 3+ cation and C stands for a 4+ or a 5+ cation, and
    wherein C is a mixture of the elements of the group consisting of Ti, Zr, Hf, Ce, Th, Nb, and Ta.

2. The turbine component as claimed in claim 1, wherein A is a mixture of the elements selected from the group consisting of Ba, Mg, Ca, Sr, Li, Na, and K.

3. The turbine component as claimed in claim 2, wherein B is a mixture of the elements selected from the group consisting of rare earth lanthanides Co, Mn, Sc, Y, Al, Ga, and In.

4. The turbine component as claimed in claim 1, wherein an oxidation-resistant metallic layer is underlying the tungsten bronze structured ceramic coating material.

5. The turbine component as claimed in claim 4, wherein the oxidation-resistant metallic layer is an MCrAlX-layer where M is selected from or a mixture of the elements of the group consisting of Fe, Co, Ni, and X stands for an element selected from or being a mixture of the elements of the group consisting of Y, Si, Hf and the rear earth elements.

6. A thermal barrier coating, comprising:
    a tungsten bronze structured ceramic material,
    wherein the tungsten bronze structured ceramic coating material has the formula $AO-B_vO_w-C_yO_z$ where O stands for Oxygen, A stands for a 2+ or a 1+ cation, B stands for a 2+ or 3+ cation and C stands for a 4+ or a 5+ cation, and
    wherein C is a mixture of the elements of the group consisting of: Ti, Zr, Hf, Ce, Th, Nb, and Ta.

7. The thermal barrier coating as claimed in claim 6, wherein A is a mixture of the elements of the group consisting of: Ba, Mg, Ca, Sr, Li, Na, and K.

8. The thermal barrier coating as claimed in claim 7, wherein B is a mixture of the elements of the group consisting of: the rare earth lanthanides, Co, Mn, Sc, Y, Al, Ga, and In.

* * * * *